A. ROTH.
DOUGH MIXING MACHINE.
APPLICATION FILED OCT. 4, 1909.

1,142,461. Patented June 8, 1915.

Witnesses
Bessie A. Beall
Arthur H. Ewald

Inventor
Anton Roth
by Alfred M. Allen
Attorney

UNITED STATES PATENT OFFICE.

ANTON ROTH, OF NEWPORT, KENTUCKY.

DOUGH-MIXING MACHINE.

1,142,461.   Specification of Letters Patent.   Patented June 8, 1915.

Application filed October 4, 1909. Serial No. 520,797.

*To all whom it may concern:*

Be it known that I, ANTON ROTH, a citizen of the United States, residing in Newport, in the county of Campbell and State of Kentucky, have invented certain new and useful Improvements in Dough-Mixing Machines, of which the following is a full, clear, and exact description, reference being had to the accompanying drawings, forming part of this specification.

My improvements relate to machines for the mixing and kneading of dough, more particularly for bread making, and the invention has particular reference to that certain novel construction of agitator or stirrer for the mixing of the dough, whereby the agitator may be readily and easily cleaned.

In dough mixing machines as heretofore constructed, various forms of beaters and stirrers have been employed, the arms of the stirrers being twisted and bent in various directions with the object of coming more readily in contact with the dough material. Moreover it is usual to construct the stirrer arms and frames of metal, oval or cylindrical in cross section. As a result, the cleaning of the machine, and the scraping off of the agitator or stirrer is a very long and tedious operation.

The object of my invention is to provide a stirring frame or agitator for such dough mixers, in which all curved and twisted surfaces shall be avoided, and only flat angular surfaces provided which can be readily and easily cleaned, which at the same time presents ample means for thoroughly agitating the dough.

Figure 1:
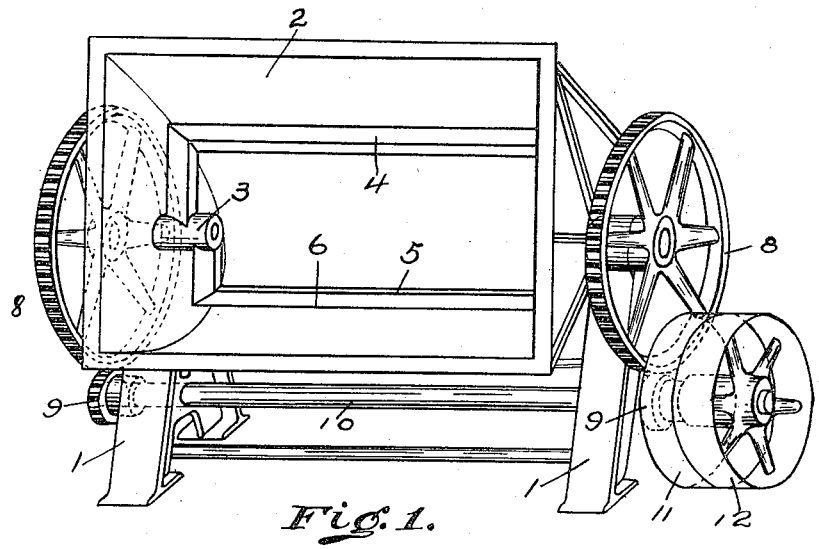
Figure 2:
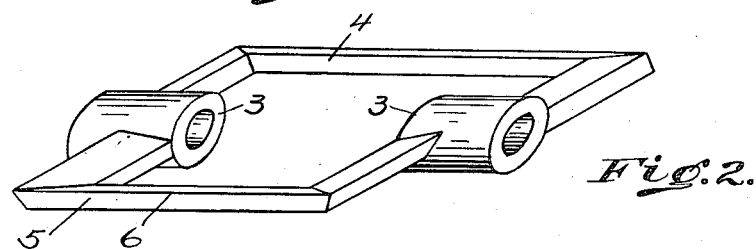
Figure 3:
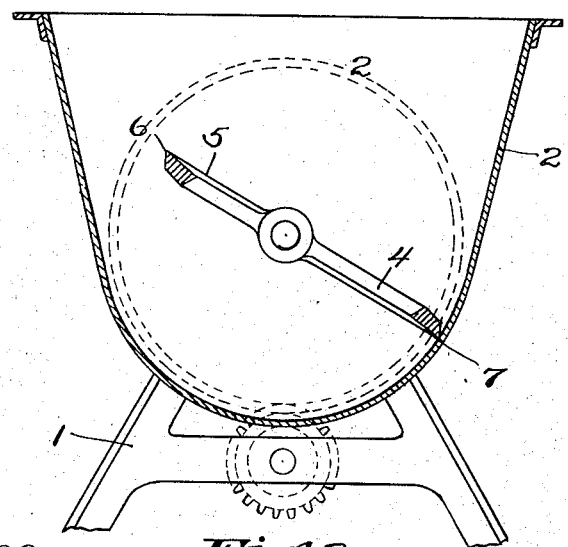

In the drawings Figure 1 is a perspective view of my improved dough mixer with the receptacle in tilted position. Fig. 2 is a perspective view of the agitator. Fig. 3 is a central vertical cross section of the machine.

1, 1 are the usual standards for supporting the operating parts, and supported on these standards is the dough receptacle 2, mounted in the usual way so that it can be tilted forward to discharge the contents of the dough.

The agitator or stirrer comprises a pair of substantial hubs 3, provided with the rectangular frames 4, 5, of different sizes projecting from the hubs on opposite sides. The frame 4 is of a size to scrape the ends and sides of the receptacle, while the frame 5 is considerably smaller in dimensions so that the path of this frame will lie entirely inside the path of the outer frame. All the surfaces of these two frames are flat and the outer upper edge of the inner frame 6, and the outer lower edge of the outer frame 7, as the stirrer is rotated in the direction of the arrow shown in Fig. 3, are beveled so as to form somewhat of a cutting edge.

The hubs 3, 3, of the agitator are securely mounted on stub axles which have their bearings in the upper ends of the supports 1, 1, outside the receptacle, and these axles are driven by the gears 8, 8, which mesh with the pinions 9, on either end of the driving shaft 10, upon which is secured tight and loose pulleys 11, 12 through which the driving power is supplied to the machine.

Inasmuch as all of the surfaces of the agitator frames are flat and the agitator frames are rectangular in shape, it will be evident that the agitator can be very easily cleaned after each operation.

Having thus described my invention what I claim as new and desire to secure by Letters Patent, is:

1. In a dough mixing machine, the combination with a receptacle, of an agitator therefor, with means for rotating same, said agitator comprising a pair of rectangular frames projecting on opposite sides of the axis of rotation, each frame comprising two side arms and a single longitudinal bar at the ends of the side arms, one frame of a size to closely hug the sides and ends of the receptacle, and the other frame of smaller dimensions to traverse a path through the receptacle within the pathway of the larger frame, and each agitating frame having flat unbroken surfaces on all of its faces with the upper and lower surfaces of each member of the rectangular frame meeting flush with the corresponding surface of its contiguous member.

2. In a dough mixing machine, the combination with a receptacle, of an agitator therefor, with means for rotating same, said agitator comprising a pair of rectangular frames projecting on opposite sides of the axis of rotation, each frame comprising two side arms and a single longitudinal bar at the ends of the side arms, one frame of a size to closely hug the sides and ends of the receptacle, and the other frame of smaller dimensions to traverse a path through the receptacle within the pathway of the larger frame, and each agitating frame having flat unbroken surfaces on all of its faces, with the front faces of the longitudinal portions of the frames beveled to form cutting edges with the upper and lower surfaces of each member of the rectangular frame meeting flush with the corresponding surface of its contiguous member.

ANTON ROTH.

Witnesses:
 BESSIE A. BEALL,
 EARL W. GRIFFIN.